(12) United States Patent
Iio (10) Patent No.: US 9,407,081 B2
(45) Date of Patent: Aug. 2, 2016

(54) WIRING HARNESS AND METHOD FOR FIXING CONNECTOR SET (75) Inventor: Kiyokazu Iio, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 0 days.

(21) Appl. No.: 14/372,341

(22) PCT Filed: Jul. 20, 2012

(86) PCT No.: PCT/JP2012/068463
§ 371 (c)(1),
(2), (4) Date: Jul. 15, 2014

(87) PCT Pub. No.: WO2013/108430
PCT Pub. Date: Jul. 25, 2013

(65) Prior Publication Data
US 2015/0000973 A1 Jan. 1, 2015

(30) Foreign Application Priority Data

Jan. 16, 2012 (JP) ................... 2012-005914

(51) Int. Cl.
*H02G 15/04* (2006.01)
*H01R 31/08* (2006.01)
*H01B 7/00* (2006.01)
*H01B 7/28* (2006.01)
*H01B 13/012* (2006.01)

(52) U.S. Cl.
CPC .............. *H02G 15/04* (2013.01); *H01B 7/0045* (2013.01); *H01B 7/2806* (2013.01); *H01B 13/01263* (2013.01); *H01R 31/085* (2013.01); *H02G 15/043* (2013.01); *Y10T 29/49174* (2015.01)

(58) Field of Classification Search
CPC ................................ H01R 13/73; H01R 31/08
USPC .................................................. 174/72 A, 93
See application file for complete search history.

(56) References Cited

FOREIGN PATENT DOCUMENTS

| JP | 3-55663 | 5/1991 |
|----|---------|--------|
| JP | 06-124746 | 5/1994 |
| JP | 2000004525 | 1/2000 |
| JP | 2000331751 | 11/2000 |
| JP | 2001210973 | 8/2001 |
| JP | 2010-67405 | * 3/2010 |
| JP | 2010-67457 | * 3/2010 |
| JP | 2011165376 | 8/2011 |
| JP | 2012003856 | 1/2012 |

OTHER PUBLICATIONS

International Search Report dated Oct. 9, 2012.

* cited by examiner

*Primary Examiner* — Chau N Nguyen
(74) *Attorney, Agent, or Firm* — Gerald E. Hespos; Michael J. Porco; Matthew T. Hespos (57) ABSTRACT

In a wiring harness, a plurality of terminals are mounted on end parts of a plurality of wires to touch strands of the wires. A connector set includes a first connector in which the plurality of terminals are inserted and a second connector to be connected to the first connector. The strands of the plurality of wires and the plurality of terminals are made of mutually different metals. A busbar for shorting the plurality of terminals by being connected to the plurality of terminals inserted in the first connector when the first connector is connected to the second connector is provided in the second connector. A covering member covers the connector set.

4 Claims, 5 Drawing Sheets

WIRING HARNESS AND METHOD FOR FIXING CONNECTOR SET

BACKGROUND

1. Field of the Invention

The present invention relates to a wiring harness.

2. Description of the Related Art

Conventionally, various techniques have been proposed on wiring harnesses. For example, Japanese Unexamined Patent Publication No. 2000-4525 and Japanese Unexamined Patent Publication No. 2000-331751 disclose a method for fixing a connector mounted on a branch line of a wiring harness to a main line of the wiring harness.

In a wiring harness, a terminal to be inserted into a connector may be mounted on an end part of a wire. In this case, if strands of the wire and the terminal to be brought into contact with the strands are made of mutually different metals, electrolytic corrosion (corrosion) may occur in a contact part of these. Specifically, if an electrolyte aqueous solution adheres to the contact part of the strands and the terminal made of mutually different metals, electrolytic corrosion occurs in either the stands or the terminal made of the metal having a lower standard electrode potential. If dust or dirt in the atmosphere adheres to the contact part of the strands and the terminal and, further, moisture adheres to the contact part such as due to dew condensation, moisture containing ionic substances included in the dust or dirt is produced. As a result, an electrolyte aqueous solution adheres to the contact part.

Accordingly, the present invention was developed in view of the aforementioned point and aims to provide a technique capable of suppressing the occurrence of electrolytic corrosion on a contact part of stands of a wire and a terminal made of mutually different metals in a wiring harness.

SUMMARY OF THE INVENTION

A first aspect of the present invention is directed to a wiring harness, including a plurality of wires constituting a branch line of the wiring harness; a plurality of terminals mounted on end parts of the plurality of wires to touch strands of the wires; and a connector set including a first connector in which the plurality of terminals are inserted and a second connector to be connected to the first connector; wherein the strands of the plurality of wires and the plurality of terminals are made of mutually different metals; a busbar for shorting the plurality of terminals by being connected to the plurality of terminals inserted in the first connector when the first connector is connected to the second connector is provided in the second connector; a sheet-like or bag-like covering member is further provided for covering the connector set; the connector set covered with the covering member is fixed to a main line of the wiring harness; and one adhesive tape is wound over the covering member around the connector set and the main line together after being wound over the covering member around a part of the branch line below the neck of the connector set to tie an opening of the covering member and wound over the covering member around a branched base end part of the branch line and the main line together.

The covering member may be a vinyl bag.

The invention also is directed to a method for fixing a connector set mounted on an end part of a branch line of a wiring harness to a main line of the wiring harness in which a plurality of terminals are mounted on end parts of a plurality of wires constituting the branch line to touch strands of the wires, the connector set includes a first connector in which the plurality of terminals are inserted and a second connector to be connected to the first connector, the strands of the plurality of wires and the plurality of terminals are made of mutually different metals, and a busbar for shorting the plurality of terminals by being connected to the plurality of terminals inserted in the first connector when the first connector is connected to the second connector is provided in the second connector, the method including (a) a step of covering the connector set with a bag-like or sheet-like covering member; (b) a step of tying an opening of the covering member by winding an adhesive tape over the covering member around a part of the branch line below the neck of the connector set after the step (a); (c) a step of winding an adhesive tape over the covering member around a branched base end part of the branch line and the main line together after the step (b); and (d) a step of winding an adhesive tape over the covering member around the connector set and the main line together after the step (c); one adhesive tape being used in a series of the steps (b) to (d).

The connector set in which the terminals mounted on the end parts of the wires to touch the strands of the wires are inserted is covered with the covering member, the adhesion of dust and dirt to contact parts of the strands of the wires and the terminals can be suppressed. Thus, the occurrence of electrolytic corrosion in the contact parts of the strands of the wires and the terminals can be suppressed.

The process from the step of tying the opening of the covering member covering the connector set to the step of fixing the connector set to the main line is performed using one adhesive tape, a series of these operations can be easily and quickly performed.

Since the vinyl bag preferably is used as the covering member for covering the connector set, the occurrence of electrolytic corrosion in the contact parts of the strands of the wires and the terminals can be suppressed by an inexpensive configuration.

An object, features, aspects and advantages of this invention will become more apparent upon reading the following detailed description along with the accompanying drawings.

DETAILED DESCRIPTION OF THE PREFERRED EMBODIMENTS

Figure 1:
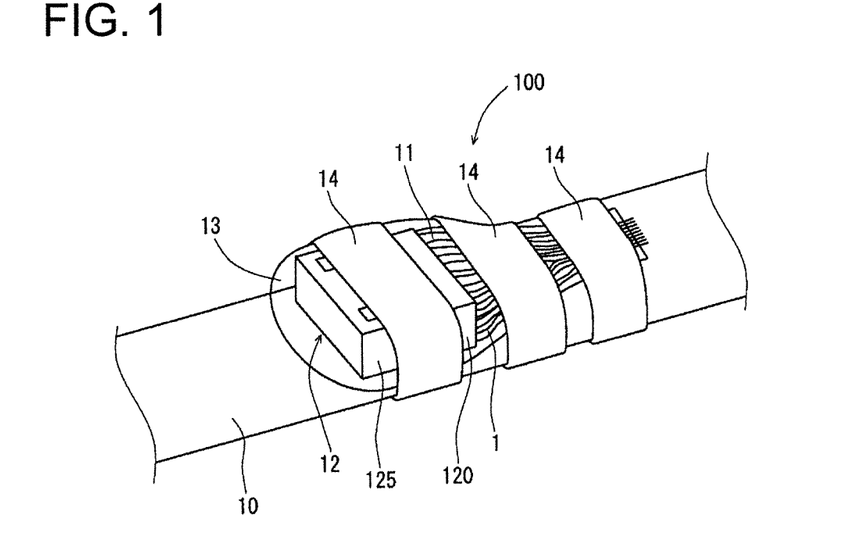
FIG. 1 is a perspective view showing the structure of a wiring harness.

FIG. 1 is a perspective view showing the structure of a wiring harness 100 according to an embodiment. The wiring harness 100 includes a wire bundle composed of a plurality of wires 1, and some of the plurality of wires 1 are branched off as a branch line 11 from a main line 10. A connector set 12 is mounted on an end part of the branch line 11. The connector set 12 and the branch line 11 are covered with a transparent vinyl bag 13 as a covering member. The connector set 12 and the branch line 11 are fixed to the main line 10 by an adhesive tape 14 in a state covered with the vinyl bag 13. An adhesive tape may be wound around the wire bundle of the main line 10 or a protective member such as a corrugated tube may be mounted thereon. Further, although the wire bundle of the branch line 11 in an exposed state are covered with the vinyl bag 13 in this embodiment, the wire bundle may be covered with the vinyl bag 13 in a state wound with an adhesive tape.

Figure 2:
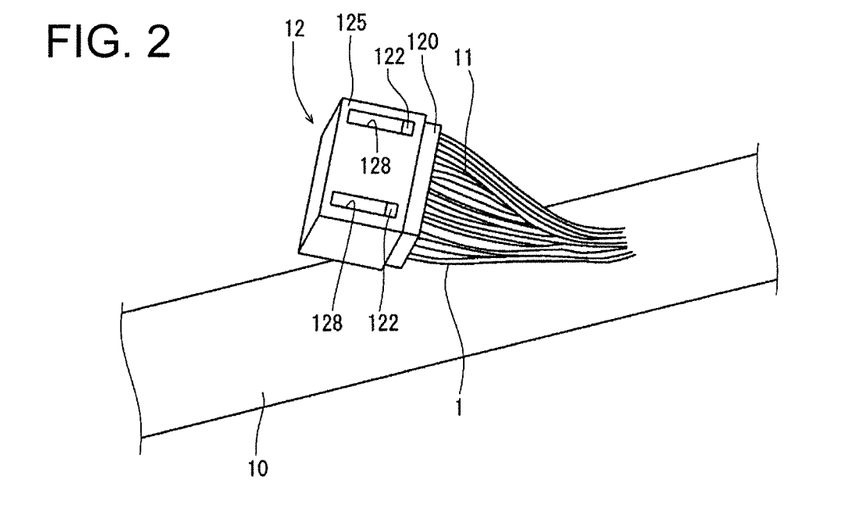
FIG. 2 is a view showing a state where a connector set is mounted on an end part of a branch line branched off from a main line.

FIG. 2 is a view showing a state where the connector set 12 is not covered with the vinyl bag 13 in the wiring harness 100 and before the connector set 12 is fixed to the main line 10. The connector set 12 is called a joint connector and composed of a female connector 120 into which later-described terminals 20 mounted on end parts of the plurality of wires 1 constituting the branch line 11 are to be inserted, and a male connector 125 to be connected to the female connector 120. A busbar 127 to be described later is provided in the male connector 125. The busbar 127 provided in the male connector 125 is connected to a plurality of terminals 20 inserted into the female connector 120 when the male connector 125 and the female connector 120 are connected. In this way, the plurality of terminals 20 mounted on the end part of the branch line 11 are shorted. Which terminals 20 are shorted in the plurality of terminals 20 is determined by the shape of the busbar 127.

Figure 3:
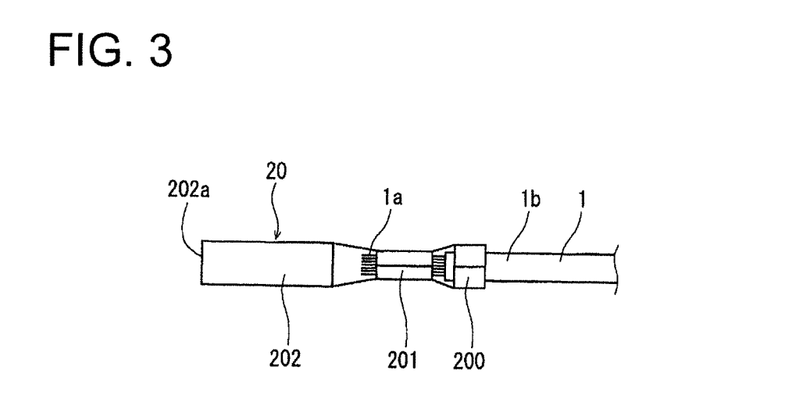
FIG. 3 is a view showing a state where a terminal is mounted on an end part of a wire.

FIG. 3 is a view showing a state where the terminal 20 is mounted on the end part of the wire 1 of the branch line 11. As shown in FIG. 3, the wire 1 is composed of a plurality of strands 1a and a wire coating member 1b covering the plurality of strands 1a. On the end part of the wire 1 where the terminal 20 is to be mounted, the wire coating member 1b is removed from the tip of the wire 1, thereby exposing the plurality of strands 1a. The terminal 20 is so mounted on this end part as to touch the plurality of exposed strands 1a.

The terminal 20 includes an insulation barrel 200 to be crimped to the wire coating member 1b on the end part of the wire 1, a wire barrel 201 to be crimped to the plurality of strands 1a exposed at the end part of the wire 1 and a fitting portion 202 to be fitted to the busbar 127 of the male connector 125. The fitting portion 202 includes a fitting opening 202a on the tip thereof and the busbar 127 is inserted into this fitting opening 202a.

In this embodiment, the terminal 20 and the strands 1a of the wire 1 to be held in contact with the terminal 20 are made of mutually different metals. The terminal 20 is, for example, made of copper or copper alloy such as brass or such a material to which tin plating is applied. Each strand 1a of the wire 1 is, for example, made of aluminum or aluminum alloy.

Since the terminal 20 and the strands 1a are made of mutually different metals in this way, if an electrolyte aqueous solution adheres to a contact part of these, there is a possibility of the occurrence of electrolytic corrosion which is one type of corrosion. Since the strands 1a have a lower standard electrode potential than the terminal 20 in this example, electrolytic corrosion may possibly occur in the strands 1a. As a result, a contact failure between the terminal 20 and the strands 1a may possibly occur.

Accordingly, in this embodiment, the connector set 12 in which the terminals 20 are inserted is covered with a covering member (vinyl bag 13 in this example), thereby making the adhesion of dust and dirt to the contact parts of the terminals 20 and the strands 1a difficult. If dust and dirt adhere to the contact part of the terminal 20 and the strands 1a, ionic substances included therein are contained in moisture adhering to the contact part such as due to dew condensation, wherefore an electrolyte aqueous solution may possibly adhere to the contact part. Thus, by making the adhesion of dust and dirt to the contact part of the terminal 20 and the strand 1a difficult, the occurrence of electrolytic corrosion in this contact part can be suppressed. Further, since the vinyl bag 13 makes the adhesion of moisture to the contact part of the terminal 20 and the strands 1a difficult to a certain degree, the occurrence of electrolytic corrosion in this contact part can be suppressed also in this aspect.

Figure 4:
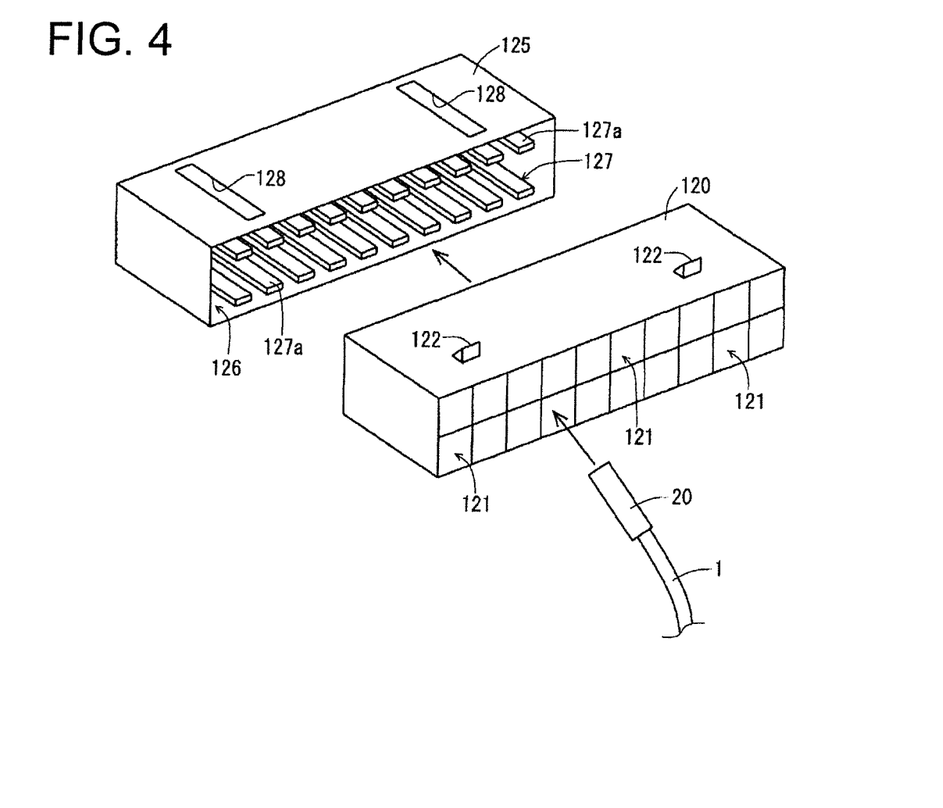
FIG. 4 is a perspective view showing the structures of a female connector and a male connector of the connector set.
Figure 5:
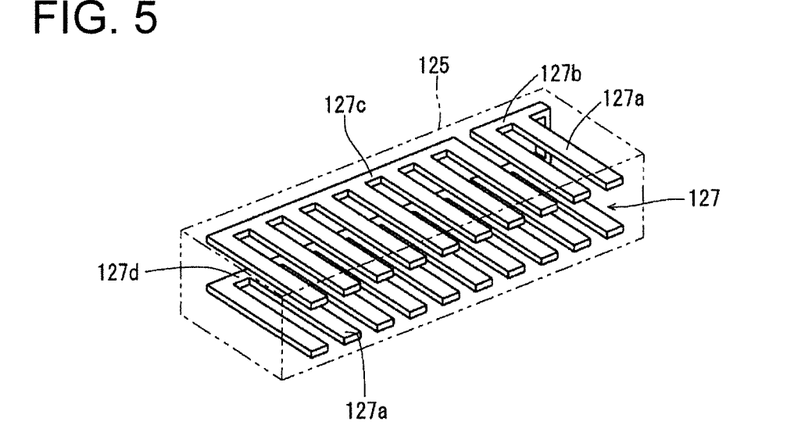
FIG. 5 is a perspective view showing the structure of a busbar in the male connector.

FIG. 4 is a perspective view showing the structures of the female connector 120 and the male connector 125 of the connector set 12. The female connector 120 and the male connector 125 are shown in a separated state in FIG. 4. FIG. 5 is a perspective view showing the structure of the busbar 127 provided in the male connector 125. The outer shape of the male connector 125 is shown in broken line in FIG. 5.

The female connector 120 includes a plurality of insertion holes 121 into which the plurality of terminals 20 mounted on the end parts of the plurality of wires 1 constituting the branch line 11 are to be respectively inserted. In this example, the plurality of insertion holes 121 are arranged in two upper and lower rows and ten insertion holes 121 are present in each row. In the female connector 120, the terminal 20 is locked to the female connector 120 in the insertion hole 121 when being inserted into the insertion hole 121, with the result that the terminal 20 does not come out from the insertion hole 121. In a state where the terminal 20 is locked to the female connector 120 in the insertion hole 121, the terminal 20 is not exposed to the outside of the insertion hole 121 in the entire area thereof. When the terminal 20 is inserted into the insertion hole 121 through one end, the fitting opening 202a of the fitting portion 202 of the terminal 20 can be visually confirmed from the other end of the insertion hole 121.

Further, a plurality of locking projections 122 are provided on the upper surface of the female connector 120. In this example, two locking projections 122 are provided. The plurality of locking projections 122 are respectively engaged with a plurality of locking holes 128 provided in the upper surface of the male connector 125.

A fitting opening 126 is provided in a side surface of the male connector 125, and the female connector 120 is inserted into this fitting opening 126. The busbar 127 is provided in the male connector 125. The busbar 127 is, for example, made of copper or copper alloy such as brass and shorts the plurality of terminals 20 inserted into the female connector 120. In other words, the busbar 127 shorts the plurality of wires 1, on which the plurality of terminals 20 inserted into the female connector 120 are respectively mounted.

The busbar 127 includes a plurality of bar-like conductors 127a to be respectively inserted into the plurality of insertion holes 121 of the female connector 120 from a side opposite to the one from which the terminals 20 are inserted. In this example, the plurality of bar-like conductors 127a are arranged in two upper and lower rows and ten bar-like conductors 127a are present in each row similarly to the insertion holes 121. The bar-like conductors 127a are so inserted into the insertion holes 121 as to be inserted into the fitting openings 202a of the fitting portions 202 of the terminals 20 in the insertion holes 121. The bar-like conductors 127a are connected to the fitting portions 202 when being inserted into the fitting openings 202a of the fitting portions 202 of the terminals 20.

In the busbar 127 according to this embodiment, a plurality of bar-like conductors 127a are coupled to each other by each of coupling conductors 127b to 127d. Specifically, as shown in FIG. 5, a total of four bar-like conductors 127a, i.e. two bar-like conductors 127a on the right side in the upper row and two bar-like conductors 127a on the right side in the lower row are coupled by the coupling conductor 127b. The remaining eight bar-like conductors 127a in the upper row are coupled to each other by the coupling conductor 127c, and the remaining eight bar-like conductors 127a in the lower row are coupled to each other by the coupling conductor 127d.

A plurality of locking holes 128 to be respectively engaged with the plurality of locking projections 122 of the female connector 120 are provided in the upper surface of the male connector 125. In this example, two locking holes 128 are provided.

In the case of fitting the female connector 120 and the male connector 125 structured as described above to each other, the female connector 120 is inserted into the fitting opening 126 of the male connector 125. Then, the plurality of locking projections 122 of the female connector 120 are respectively engaged with the plurality of locking holes 128 of the male connector 125 (see FIG. 2), whereby the female connector 120 and the male connector 125 are connected. At this time, the plurality of bar-like conductors 127a of the busbar 127 of the male connector 125 are respectively inserted into the fitting openings 202a of the fitting portions 202 of the plurality of terminals 20 arranged in the plurality of insertion holes 121 of the female connector 120 and connected to the fitting portions 202 of the plurality of terminals 20. In this way, four terminals 20 connected to the four bar-like conductors 127a coupled by the coupling conductor 127b are shorted, with the result that four wires 1 on which these four terminals 20 are mounted are shorted. Further, eight terminals 20 connected to the eight bar-like conductors 127a coupled by the coupling conductor 127c are shorted, with the result that eight wires 1 on which these eight terminals 20 are mounted are shorted. Furthermore, eight terminals 20 connected to the eight bar-like conductors 127a coupled by the coupling conductor 127d are shorted, with the result that eight wires 1 on which these eight terminals 20 are mounted are shorted.

As just described, when the female connector 120 and the male connector 125 are connected, the plurality of terminals 20 inserted into the female connector 120 are shorted, with the result that the plurality of wires 1 on which the plurality of terminals 20 are respectively mounted are shorted. Note that if the shapes of the coupling conductors are changed in the busbar 127, which terminals 20 are shorted in the plurality of terminals 20 changes.

Next, a method for fixing the connector set 12 connected to the end part of the branch line 11 to the main line 10 is described in detail. In this embodiment, the connector set 12 is fixed to the main line 10 using only one adhesive tape 14 having a first section extending from a first end of the adhesive tape 14, a second section extending from the first section and towards a second end of the adhesive tape 14, a third section extending from the second section towards the second end, and a fourth section extending between the third section and the second end. That is, the connector set 12 is fixed to the main line 10 by the adhesive tape 14 without cutting the adhesive tape 14.

Figure 6:
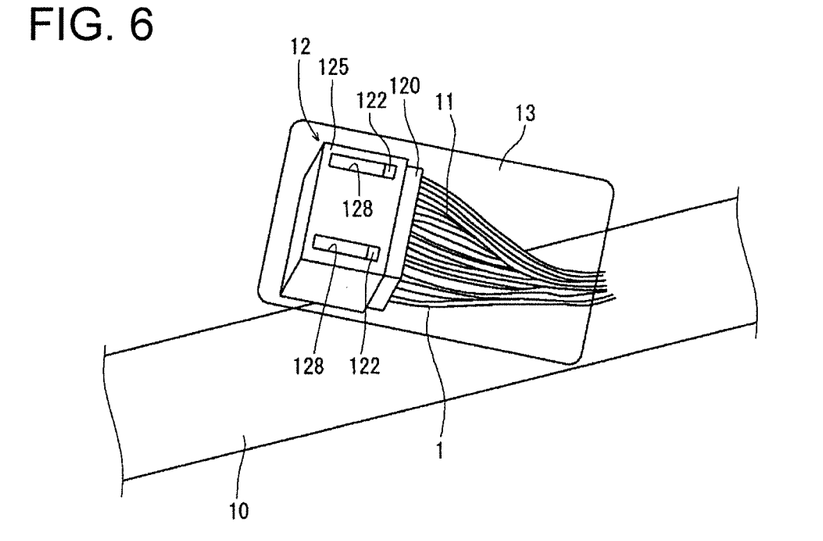
FIG. 6 is a view showing a state where the connector set is covered with a vinyl bag.

First, as shown in FIG. 6, the connector set 12 mounted on the end part of the branch line 11 is completely covered, for example, with the rectangular vinyl bag 13. At this time, the branch line 11 is also covered with the vinyl bag 13.

Figure 7:
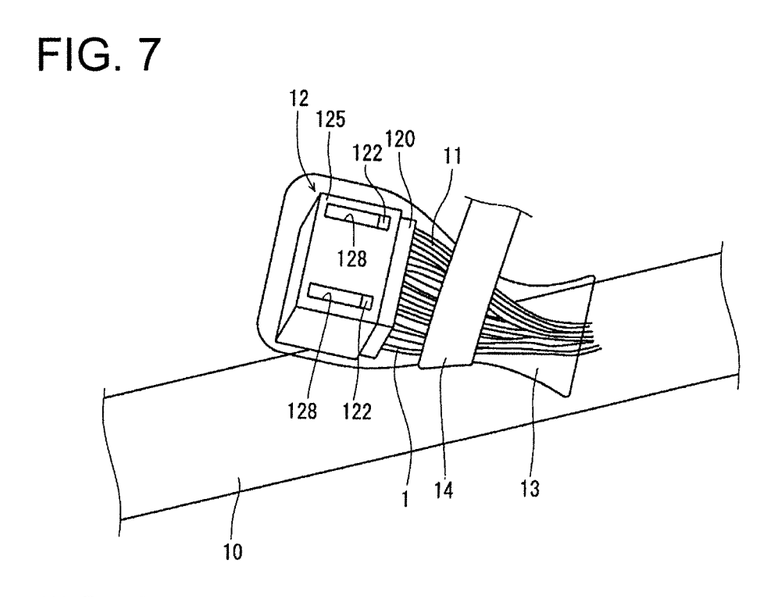
FIG. 7 is a view showing a state where an opening of the vinyl bag covering the connector set is tied with an adhesive tape.

Subsequently, as shown in FIG. 7, an opening of the vinyl bag 13 is tied with the adhesive tape 14. Specifically, the opening of the vinyl bag 13 is tied by winding the first section of the adhesive tape 14 over the vinyl bag 13 around a part of the branch line 11 below the neck of the connector set 12. In other words, the opening of the vinyl bag 13 is tied by winding the adhesive tape 14 over the vinyl bag 13 around a part of the branch line 11 near the connector set 12.

Figure 8:
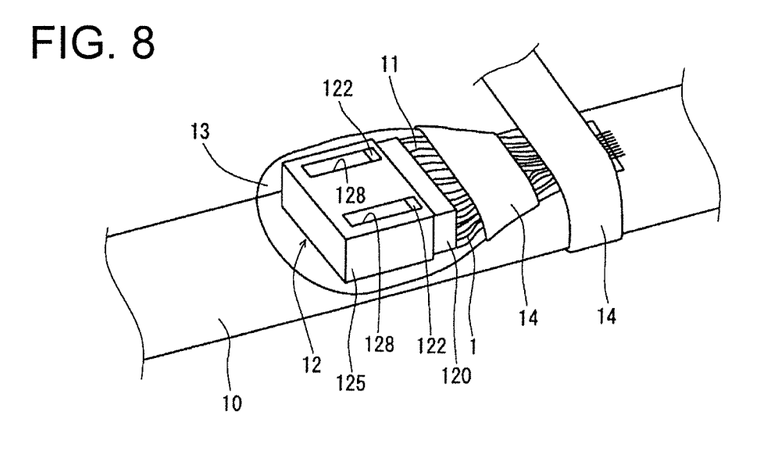
FIG. 8 is a view showing a state where a branched base part of the branch line is fixed to the main line with the adhesive tape.

Subsequently, without cutting the adhesive tape 14 having tied the opening of the vinyl bag 13, a branched base end part of the branch line 11 is fixed to the main line 10 by the second section of the adhesive tape 14 as shown in FIG. 8. Specifically, without cutting the adhesive tape 14 having tied the opening of the vinyl bag 13, the adhesive tape 14 is wound over the vinyl bag 13 around the branched base end part of the branch line 11 and the main line 10 together, thereby fixing the branched base end part of the branch line 11 to the main line 10.

Figure 9:
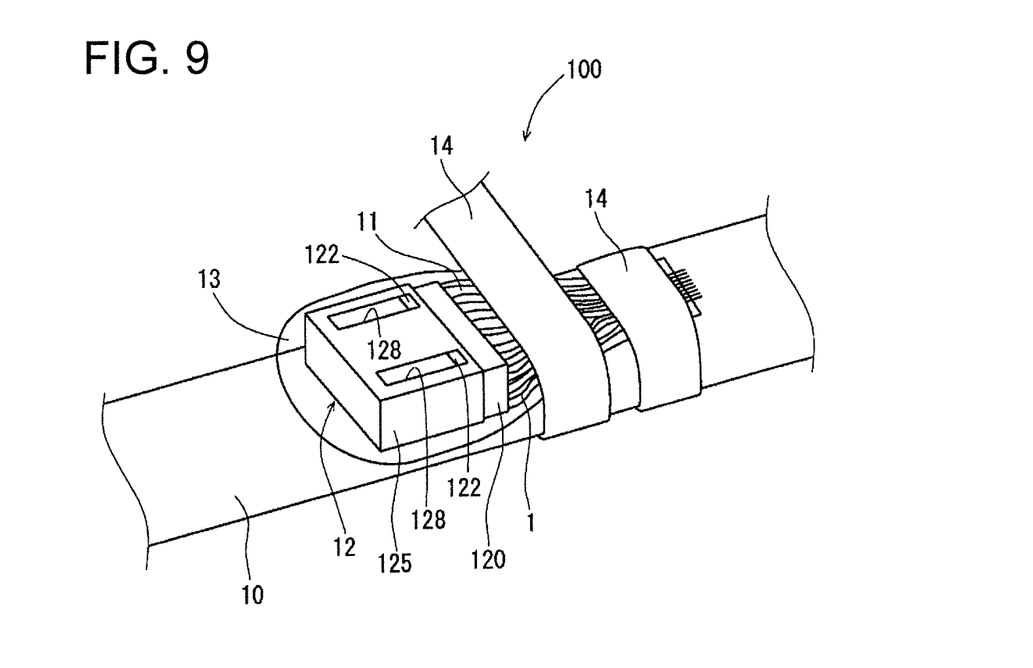
FIG. 9 is a view showing a state where the adhesive tape is roughly wound around the branch line and the main line.

Subsequently, without cutting the adhesive tape 14, the third section of the adhesive tape 14 is wound, for example, roughly wound over the vinyl bag 13 around the branch line 11 and the main line 10 together from the branched base end part of the branch line 11 toward the connector set 12 as shown in FIG. 9. When the adhesive tape 14 is wound over the vinyl bag 13 around the branch line 11 and the main line 10 together, the connector set 12 is fixed to the main line 10 by the fourth section of the adhesive tape 14, whereby the wiring harness 100 shown in FIG. 1 is completed.

Note that a size of the vinyl bag 13 is determined based on a size of the connector set 12, a width of the adhesive tape 14 and how to wind the adhesive tape 14 around the branch line 11 and the main line 10. If there are a plurality of types of connector sets 12, the size of the vinyl bag 13 is determined based on a size of the largest connector set 12, the width of the adhesive tape 14 and how to wind the adhesive tape 14 around the branch line 11 and the main line 10. If a (mm), b (mm) denote a vertical dimension and a horizontal dimension of the largest connector set 12 and c (mm) denotes the width of the adhesive tape 14, a vertical dimension of the vinyl bag 13 is set to be, for example, a+10 (mm). Further, a horizontal dimension of the vinyl bag 13 is set to be, for example, b+2×c (mm). Here, the horizontal dimension means a dimension in a direction from the branched base end of the branch line 11 toward the connector set 12, i.e. an extending direction of the branch line 11 when the connector set 12 is covered with the vinyl bag 13 as shown in FIG. 6. The vertical dimension means a dimension in a direction perpendicular to both the extending direction of the branch line 11 and a thickness direction of the connector set 12 or the vinyl bag 13 when the connector set 12 is covered with the vinyl bag 13 as shown in FIG. 6.

Although rough winding of winding the adhesive tape 14 with a space formed between two successive winds is adopted in winding the adhesive tape 14 from the branched base end part of the branch line 11 toward the connector set 12 in the above example, half overlap winding of winding the adhesive tape 14 while the succeeding wind is partly overlapped on the preceding one may be adopted.

Further, although a process from a step of tying the opening of the vinyl bag 13 to a step of fixing the connector set 12 to the main line 10 is performed by one adhesive tape 14 in the above example, the process from the step of tying the opening of the vinyl bag 13 to the step of fixing the connector set 12 to the main line 10 may be performed using a plurality of adhesive tapes 14. For example, the adhesive tape 14 is cut after the opening of the vinyl bag 13 is tied with the adhesive tape 14. Then, after the branched base end part of the branch line 11 is fixed to the main line 10 using a new adhesive tape 14, this adhesive tape 14 is cut. Thereafter, after the connector set 12 is fixed to the main line 10 using a new adhesive tape 14, this adhesive tape 14 is cut. Further, three adhesive tapes 14 may be prepared in advance, one adhesive tape 14 may be used in the step of tying the opening of the vinyl bag 13, one adhesive tape 14 may be used in a step of fixing the branched base end part of the branch line 11 to the main line 10 and one adhesive tape 14 may be used in the step of fixing the connector set 12 to the main line 10.

Further, any covering member may be used to cover the connector set 12 as long as it makes the adhesion of dust and dirt to the contact parts of the terminals 20 and the strands 1a difficult. For example, a plastic bag, a nylon bag or a cellophane bag may be used instead of the vinyl bag 13.

Although the covering member for covering the connector set 12 is bag-shaped in the above example, it may have any shape as long as it can cover the connector set 12. For example, a sheet-like covering member may be used and the connector set 12 may be covered by being wrapped around with this covering member. In this case, as in the case of using the bag-like covering member, an opening of the covering member (wrap opening) is tied after the connector set 12 is wrapped around with the sheet-like covering member.

As described above, since the connector set 12 in which the terminals 20 mounted on the end parts of the wires 1 to touch the strands 1a are inserted is covered with the covering member in this embodiment, dust and dirt are unlikely to adhere to the contact parts of the terminals 20 and the strands 1a of the wires 1. As described above, if dust or dirt adheres to the contact part of the terminal 20 and the strands 1a, ionic substances included therein are contained in moisture adhering to the contact part such as due to dew condensation. As a result, an electrolyte aqueous solution may possibly adhere to this contact part to cause electric corrosion. In this embodiment, the occurrence of electrolytic corrosion in the contact part can be suppressed by making the adhesion of dust and dirt to the contact part of the terminal 20 and the strand 1a difficult.

Note that since neither other connectors nor wires other than the branch line 11 are connected to the connector set 12 as a junction connector, there is no problem even if the connector set 12 is covered with the covering member.

Further, in the case of using the vinyl bag 13 as the covering member for covering the connector set 12 as in this embodiment, the adhesion of moisture to the contact parts of the terminals 20 and the strands 1a is difficult to a certain degree. Thus, the occurrence of electrolytic corrosion in the contact parts can be further suppressed. Furthermore, by using the vinyl bag 13 as the covering member for covering the connector set 12, the occurrence of electrolytic corrosion in the contact parts of the terminals 20 and the strands 1a can be suppressed by an inexpensive configuration.

Further, by using one adhesive tape 14 in the process from the step of tying the opening of the vinyl bag 13 to the step of fixing the connector set 12 to the main line 10 as in this embodiment, a series of operations from the step of tying the opening of the vinyl bag 13 to the step of fixing the connector set 12 to the main line 10 can be easily and quickly performed.

Although this invention has been described in detail above, the above description is illustrative in all aspects and this invention is not limited thereto. It should be appreciated that unillustrated numerous modifications can be assumed without departing from the scope of this invention.

The invention claimed is:

1. A wiring harness, comprising:
    a main line extending in an extending direction and comprising a bundle of wires, each of the wires including a plurality of strands made of a first metal;
    a branch line comprising a plurality of wires branched off from the bundle of wires of the main line;
    a plurality of terminals mounted on end parts of the plurality of wires to touch the strands of the wires, the plurality of terminals made of a second metal different from the first metal;
    a connector set including a first connector in which the plurality of terminals are inserted and a second connector to be connected to the first connector;
    a busbar provided in the second connector for shorting the plurality of terminals by being connected to the plurality of terminals inserted in the first connector when the first connector is connected to the second connector;
    a covering member having a connector set holding portion and an open end communicating with the connector set holding portion, the connector set disposed in the connector set holding portion so that portions of the plurality of wires project from the open end; and
    an adhesive tape extending in a longitudinal direction between first and second ends, the adhesive tape having a first section extending from the first end, a second section extending from the first section towards the second end, a third section extending from the second section towards the second end, and a fourth section extending between the third section and the second end, wherein
    the first section is wound about the covering member at a first position between the open end and the connector set holding portion to secure the covering member to the plurality of wires,
    the second section is wound about the covering member, a base end portion of the branch line, and the main line at a second position between the first section and the open end of the covering member,
    the third section is wound about the covering member, and the main line at the first position to secure the covering member to the main line, and
    the fourth section is wound about the covering member, the connector set, and the main line at a third position to secure the connector set to the main line, wherein
    the first position, the second position, and the third position are spaced from one another along the extending direction of the main line.

2. A wiring harness according to claim 1, wherein:
    the covering member is a vinyl bag.

3. The wiring harness of claim 1, wherein the connector set has a horizontal dimension in an extending direction of the branch line, the adhesive tape has a width dimension normal to the longitudinal direction, and the horizontal dimension of the connector set is at least twice as large as the width dimension of the adhesive tape.

4. A method for fixing a connector set mounted on an end part of a branch line of a wiring harness to a main line of the wiring harness, the method comprising the steps of:
    (a) separating a plurality of wires from the main line to define the branch line;
    (b) mounting a plurality of terminals on end parts of the plurality of wires so that the plurality of terminals touch strands of the plurality of wires, the terminals and strands being formed from mutually different metals;
    (c) assembling the connector set by inserting the plurality of terminals into a first connector, inserting a busbar into a second connector, and connecting the first connector and the second connector so that the busbar contacts and shorts the plurality of terminals;
    (d) inserting the connector set into a covering member, the covering member having a connector set holding portion and an open end in communication with the connector set holding portion, and the connector set disposed in the connector set holding portion;

(e) winding a first section of an adhesive tape at a first position over the covering member to secure the covering member to the plurality of wires;

(f) winding a second section of the adhesive tape over the covering member and the main line together at a second position spaced from the first section of the adhesive tape and between the first section and the open end of the covering member;

(g) winding a third section of the adhesive tape over the covering member and the main line at the first position; and (h) winding a fourth section of the adhesive tape over the connector set holding portion of the covering member and the main line at a third positioned aligned with the connector set, the third position spaced from the first section, wherein the adhesive tape is elongated in a longitudinal direction, the first section is provide at a first end of the adhesive tape, the second section is adjacent the first section in the longitudinal direction, the third section is adjacent to the second section in the longitudinal direction and spaced from the first end, and the fourth section is adjacent the third section in the longitudinal direction and spaced from the first end.

* * * * *